Patented June 17, 1930

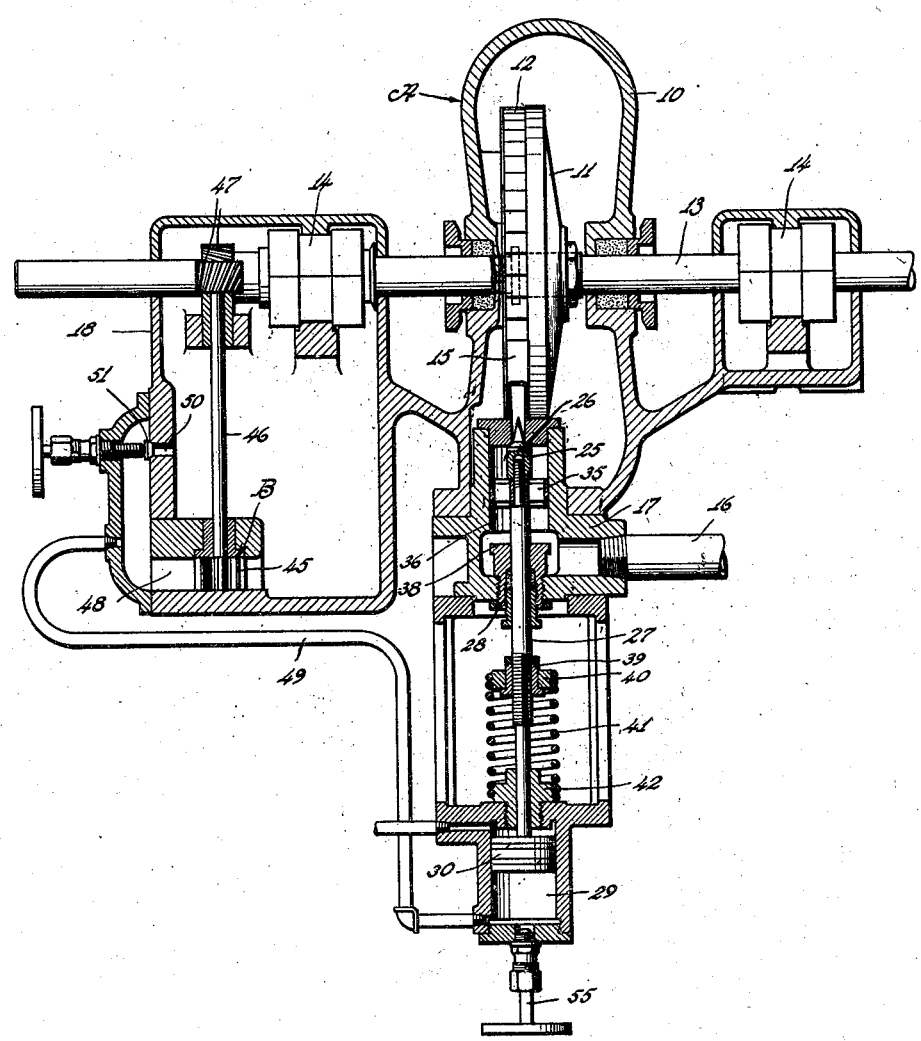

1,764,463

UNITED STATES PATENT OFFICE

RICHARD O. MULLER, OF HARTFORD, CONNECTICUT, ASSIGNOR TO THE TERRY STEAM TURBINE COMPANY, OF HARTFORD, CONNECTICUT, A CORPORATION OF CONNECTICUT

SPEED-GOVERNING MECHANISM

Application filed June 8, 1927. Serial No. 197,483.

This invention relates to speed governing mechanisms particularly for steam prime movers, such for example as steam turbines, and has as its aim to provide a mechanism of this sort which will permit of a wide range of speed of the prime mover and a very close speed regulation at any particular or selected speed.

My improved governor is characterized by its simplicity of construction, its effectiveness in operation, the ease and facility with which it may be adjusted, and the nicety with which it regulates the speed of the associated prime mover.

A further aim of the invention is to provide an improved arrangement by means of which the flow of actuating fluid to the prime mover is automatically shut off in the event of overspeeding of the prime mover through a lack of load. Furthermore in accordance with the invention, provision is made for automatically stopping the prime mover in the event of failure of proper operation on the part of the governor.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing wherein I have shown, more or less diagrammatically, one of the embodiments which the present invention may take:—

The figure is a general layout of an installation in which my invention is incorporated.

A denotes generally the steam prime mover which may be of any suitable type but which is here shown as being a turbine having a casing 10 within which is mounted a rotor or wheel 11 provided with buckets or pockets 12. The rotor is fixed to a shaft 13 mounted in suitable bearings 14. 15 designates the nozzle to which the actuating fluid or steam is admitted through a pipe 16 and a passage in the valve body 17. The pipe 16 leads from any suitable source of supply. One of the bearings 14 is located in a chamber 18. The turbine is illustrated somewhat conventionally as the particular construction thereof forms no part of the present invention.

In accordance with the present invention the admission of steam to the turbine wheel (and therefore the speed of the wheel) is controlled by a valve 25 which in turn is controlled by a pump B connected up to the rotor or wheel of the prime mover so that as the speed of the wheel changes the pressure created by the pump is accordingly varied. The valve 25 is in the form of a needle valve adapted to co-operate with a seat 26 at the throat of the nozzle 15. This needle valve is carried by a stem 27 which extends through a stuffing box or gland 28 and into a cylinder 29. The lower end of the stem carries a piston 30.

Carried by the stem, below the needle valve 25, is an auxiliary valve 35 which is in the form of a sleeve having a close sliding fit in the cylindrical portion 36 of the passage through the valve body 17. This valve 35 in the event that the pressure pump, due to a lack of oil or other cause should fail to operate, is caused to seat on the upper surface of the packing nut 38 to thereby shut off the flow of steam from the pipe 16 to the nozzle, as is described hereinafter more in detail. Threaded on the stem between the valve body and the cylinder 29 is a flanged nut or sleeve 39 about which is a collar 40 to which is secured the upper end of a tension spring 41, the lower end of the spring being anchored to a nut or bushing 42. This spring normally tends to draw the stem downwardly.

The pressure or oil pump B may be of any suitable construction, it being shown in the present illustrated disclosure as comprising an ordinary rotary pump having a pair of gears 45. One of these gears 45 is fixed to a shaft 46 which is driven from the turbine shaft 13 in any suitable manner, as for example through spiral gears 47. The pump members 45 are located in an outlet 48 and the delivery or pressure side of the pump is connected by a pipe 49 to the cylinder 29 beneath the piston 30. Between the delivery side of the pump and the chamber 18 is a by-pass 50 which is controlled by by-pass valve 51 of any suitable construction.

The operation of the mechanism described is briefly as follows: The by-pass valve 51 may be manually adjusted so as to control the pressure to the delivery side of the pump 45 depending on the desired speed of the turbine. When the turbine is at rest, the valve 35 is seated. To start the turbine, this valve may be manually raised from its seat by means of a screw 55 adapted to be brought up against and lift the piston 30. When the turbine is put into operation, the pump is driven, setting up a pressure in the cylinder 29 below the piston so that the needle valve will be raised into proper relation to its seat. So long as the turbine is rotating at the desired speed, the needle valve will permit the correct amount of steam to flow into the nozzle 15. In the event, however, that the speed of the turbine should increase above that selected, the pump would be driven faster thereby creating a greater pressure behind the piston with the result that the needle valve would be moved toward its seat to restrict the flow of steam to the nozzle and the turbine would be brought back to the desired speed. In the event that the turbine should fall below the predetermined speed, the pump would be driven slower so that the pressure behind the piston would drop and the needle valve under the influence of the spring 41, would move away from its seat with the result that a greater amount of steam would be admitted to the turbine bringing the turbine up to speed. Thus the speed of the turbine is held very closely to that selected. By adjusting the by-pass valve 51 any desired selected speed of the turbine may be obtained within a wide range.

The needle valve 25 also constitutes an over-speed valve in that in the event that the pump should be speeded up through a lack of load, the oil pressure within the cylinder 29 would increase to close and hold the valve to its seat, thereby preventing any steam from flowing into the nozzle.

If the pump should fail to set up a pressure behind the piston 30 the machine would be immediately shut down, for in that event the spring 41 would move the stem 27 to a position where the auxiliary valve or sleeve 35 rests upon the top of the nut 38 thus shutting off the flow of steam to the nozzle.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What I claim as my invention is:—

1. In combination, a steam prime mover, a valve for controlling the flow of actuating fluid thereto during the normal operation of the same, an auxiliary valve movable with said first mentioned valve, a spring normally urging said first mentioned valve away from its seat and said auxiliary valve to a position where it shuts off the admission of steam to said prime mover, a pressure responsive device associated with said valves and acting in opposition to said spring, and a pump driven by said prime mover for controlling the pressure in said pressure responsive device.

2. In combination, a steam turbine having a wheel and a steam nozzle, a needle valve in said nozzle for controlling the volume of steam passing therethrough, an outlet leading to said nozzle, an auxiliary valve on said needle and movable therewith for shutting off the flow of steam to said nozzle, a spring normally urging said needle in a direction to move it from its seat and said auxiliary valve to closed position, a piston on said needle, a cylinder in which said piston operates, a fluid chamber, a connection between said fluid chamber and cylinder, a pressure pump interposed in said connection and driven by said turbine, a by-pass between the delivery side of said pump and said chamber, and a valve for controlling said by-pass.

3. In combination, a steam turbine having a shaft, a wheel thereon and a steam nozzle; a needle valve in said nozzle for controlling the volume of steam passing therethrough, a spring normally urging said needle valve in a direction to move it away from its seat, a piston on said needle valve, a cylinder in which said piston operates, an oil chamber through which said shaft extends, a bearing for said shaft within said chamber, a connection between said oil chamber and cylinder, a pressure pump located entirely within said oil chamber and driven by said turbine for forcing the oil from said chamber into said connection, a by-pass between the delivery side of said pump and said chamber, and a manually operable valve for controlling said by-pass.

RICHARD O. MULLER.